US012751877B2

(12) United States Patent
Kolar

(10) Patent No.: US 12,751,877 B2
(45) Date of Patent: Oct. 6, 2026

(54) PATIENT SUPPORT APPARATUS HAVING CENTRAL DUAL CONTROL SYSTEM OF CASTERS

(71) Applicant: Linet spol. s.r.o., Slany (CZ)

(72) Inventor: Vladimir Kolar, Slany (CZ)

(73) Assignee: Linet spol. s.r.o., Slany (CZ)

( * ) Notice: Subject to any disclaimer, the term of this patent is extended or adjusted under 35 U.S.C. 154(b) by 57 days.

(21) Appl. No.: 18/865,089

(22) PCT Filed: May 16, 2023

(86) PCT No.: PCT/CZ2023/000019
§ 371 (c)(1),
(2) Date: Nov. 12, 2024

(87) PCT Pub. No.: WO2023/222146
PCT Pub. Date: Nov. 23, 2023

(65) Prior Publication Data
US 2025/0312214 A1 Oct. 9, 2025

(30) Foreign Application Priority Data
May 17, 2022 (CZ) ................................ CZ2022-205

(51) Int. Cl.
*A61G 7/05* (2006.01)
*B60B 33/00* (2006.01)

(52) U.S. Cl.
CPC ........ *A61G 7/0528* (2016.11); *B60B 33/0078* (2013.01)

(58) Field of Classification Search
CPC ....... A61G 7/0528; A61G 7/08; B62B 5/0433
See application file for complete search history.

(56) References Cited

U.S. PATENT DOCUMENTS 1,006,653 A 10/1911 Hanly
8,024,101 B2 * 9/2011 Froli .................. B60B 33/0081 701/1
(Continued)

FOREIGN PATENT DOCUMENTS

CN 209059257 U * 7/2019
CN 112172410 A * 1/2021 ......... B60B 33/0078
(Continued)

OTHER PUBLICATIONS

European Patent Office, International Search Report, dated Aug. 18, 2023, in International Patent Applicaiton No. PCT/CZ2023/000019, filed on May 16, 2023.
(Continued)

*Primary Examiner* — Eric J Kurilla
(74) *Attorney, Agent, or Firm* — Thedford I. Hitaffer; Hitaffer, PLLC

(57) ABSTRACT

A patient support apparatus having a central dual control system of casters with an actuating pedal. Two opposite casters are connected by a control shaft with hexagonal cross section. Both control shafts are mutually coupled via a connecting member to a linkage rod. A servomotor with a rack is coupled to the linkage rod. The servomotor is configured to change a position of the rack of the servomotor and thus change a position of the central dual control system of casters upon manual change of position of the actuating pedal and/or upon electrical activation of the servomotor to change a position of the actuating pedal to another position of the central dual control system of casters.

14 Claims, 6 Drawing Sheets

(56) References Cited

U.S. PATENT DOCUMENTS

| | | | |
|---|---|---|---|
| 8,365,353 B2 | 2/2013 | Block et al. | |
| 8,701,229 B2 | 4/2014 | Lemire et al. | |
| 10,806,653 B2 * | 10/2020 | Upchurch | A61G 7/018 |
| 2007/0056141 A1 * | 3/2007 | Armano | B60B 33/0086 16/35 R |
| 2008/0178429 A1 * | 7/2008 | Haselsteiner | B60B 33/0092 16/35 R |
| 2012/0085595 A1 * | 4/2012 | Chen | A61G 7/018 188/1.12 |
| 2013/0061397 A1 * | 3/2013 | Wurdeman | A61G 7/16 5/611 |
| 2017/0143566 A1 * | 5/2017 | Elku | A61G 7/0512 |
| 2020/0405555 A1 | 12/2020 | Upchurch et al. | |

FOREIGN PATENT DOCUMENTS

| | | | | |
|---|---|---|---|---|
| CN | 119305614 A | * | 1/2025 | A61G 12/001 |
| IT | 201700062535 A1 | * | 12/2018 | A61G 1/0287 |
| WO | WO-9902069 A1 | * | 1/1999 | A61G 7/0519 |
| WO | WO-2022229349 A1 | * | 11/2022 | B60B 33/0092 |

OTHER PUBLICATIONS

European Patent Office, Written Opinion, dated Aug. 18, 2023, in International Patent Applicaiton No. PCT/CZ2023/000019, filed on May 16, 2023.

* cited by examiner

PATIENT SUPPORT APPARATUS HAVING CENTRAL DUAL CONTROL SYSTEM OF CASTERS

CROSS-SECTION TO RELATED APPLICATIONS

This application, filed under 35 USC 371, is a United States National Stage Application of International Application No. PCT/CZ2023/000019, filed May 16, 2023, which claims priority to CZ Application No. PV 2022-205, filed on May 17, 2022, the disclosures of which are incorporated herein by reference to their entirety.

TECHNICAL FIELD

This invention relates in general to patient support apparatuses in healthcare and nursing facilities having casters attached to a base frame or undercarriage of a patient support apparatuses, and particularly to controlling of such casters dually, using servomotor.

PRIOR ART

The prior art recognizes patient support apparatuses used in healthcare and nursery facilities that comprise casters which enable movement of such patient support apparatuses from operating room to intensive care units, or between the individual hospital departments and rooms. Such patient support apparatuses being e.g. hospital beds, nursery beds, stretchers, examinational chairs or other suitable apparatuses for use in healthcare facilities will hereinafter be referred to as a bed.

Healthcare facility beds are typically equipped with caster devices and are designed to be moved from one location to another location or to be otherwise handled inside a room. During movement of bed, it is desirable to have free rolling casters. In contrary, upon reaching a desired location a brake is applied to the casters to maintain the bed at the selected position. Casters can turn around a horizontal as well as vertical axis which allows the bed to be rolled and steered between the individual locations. Healthcare facility beds typically have four casters, some beds may be equipped with a fifth caster. Such fifth caster is an additional accessory caster used for easier handling with the bed. The fifth caster may be positioned under the bed, in the middle of undercarriage, and can be typically actuated and driven separately by its own drive. Very often the fifth caster is, in parallel, direction caster and driven caster supporting easier movement and handling with the bed.

Some beds in prior art are equipped with four separate brake mechanisms and/or steering lock mechanisms and four separate brake pedals or actuating pedals each associated with only one of the four casters. Later due to safety reasons, a central control mechanism started to be used with healthcare facility beds. At least one actuating or control pedal of the central control mechanism is positioned anywhere on the undercarriage or on any of the casters and controls the brakes of all casters at once. Preferably, the bed is equipped with more than one actuating or control pedal positioned on the undercarriage to control movement, braking or steering lock of the casters from any side of the bed where a caregiver may stand at the given moment.

Typically, central control mechanism has three positions, i.e. the actuating pedal of the central control mechanism can be positioned to:

Lower position when turning of all casters both around horizontal axis and around vertical axis is blocked. This position is referred to as "braked".

Upper position when all casters can freely turn around their horizontal as well as vertical axis, the bed can be freely moved into all directions. This position is referred to as "unbraked", Central position when turning of one or two casters around vertical axis is locked in a pre-selected position, other casters can freely turn around horizontal as well as vertical axis. This position is referred to as "ride" or straight movement direction.

The above specified central control mechanism can be controlled mechanically, and also electronically, Need to make handling and operation with a bed, when a patient is supported on, easier, a fifth caster started to be added on the bed undercarriage. The fifth caster can be also mechanical or equipped with electromotor which actuates and/or brakes the caster, or deploys and/or retracts the caster to be used. The fifth caster with electromotor has own electric control mechanism for engagement and movement of the caster. In case a healthcare facility bed is equipped with such fifth caster, the bed controller needs to include an indication component or mechanism stating if the other casters on the bed are in position "braked" or "unbraked" so that a caregiver could safely control the fifth caster and move the bed. In case the bed controller or control unit of the bed lacks such indication mechanism, a caregiver needs to physically check the bed if other casters are in position "unbraked" should he needs to move the bed to avoid any damage to bed or impairment of a patient health condition. This type of solution for handling and moving the bed is not convenient because it requires two completely separated and to each other independent systems to control four casters mounted in the undercarriage of the bed and to control the fifth caster as well. Such technical solution increases weight of the bed as well as production costs and overall complexity of production.

At present time, a trend to control bed casters in remote manner occurs. This is convenient typically when a bed is equipped with fifth caster. Yet another trend occurs on contrary tending to make production of beds cheaper and handling with beds easier. This trend is supported by a patent of the company TENTE, U.S. Pat. No. 8,365,353B2, which claims casters with electric motor, it means that each caster mounted in the bed undercarriage has its own electric motor. These casters are controlled remotely by a controller, however in case of loss of electrical voltage it is not possible then to brake the bed mechanically and lock it safely at one place, or on contrary, to unlock or unbrake the casters to be free for movement of the bed. Another disadvantage of this solution is financially demanding production and necessity of having an external power source on the bed, for example in the form of a battery positioned on the bed frame or directly inside the casters. The above stated disadvantages result in very low opportunity level of using these casters with healthcare facility beds.

Another similar technical solution known in prior art is a patent of the company STRYKER, U.S. Pat. No. 8,701,229B2. This patent discloses a mechanical switch assembly for mechanical or electrical central control mechanism of casters. A healthcare facility bed includes a central control pedal, or central actuating pedal, positioned approximately in the middle of the bed undercarriage. The central control, or actuating, pedal actuates mechanically four casters all at once and operates all casters to all positions, i.e. braked, unbraked and straight movement direction (ride). The central control pedal may be turned around mechanically, and mechanical central control can be switched over by a switch to electrical central control. Change of position of the switch is sensed by a sensor in the mechanical switch. Mechanical central control of casters is configurated in one position of pedal, in the other position of the pedal electric central control of casters is configurated. Such central control mechanism represents a certain progress in central control logic, when a caregiver may select a manner how braking and movement of casters will be controlled and operated. Disadvantage may be recognized in the fact that the caregiver must always finds out if the central control mechanism is activated for mechanical control or electrical control. Should electric central control be activated for operation, the mechanical central control cannot be used unless the control pedal is manually (mechanically) switched over, and vice versa, and switching over needs to be signalled in the bed controller.

Another close prior art is disclosed in another patent of the company STRYKER, U.S. Pat. No. 10,806,653B2. Disclosed patented system uses manual mechanical, as well as electrical central control of casters, however this technical solution is very different from the central dual control system of casters disclosed herein by the applicant. The bed in the above stated patent comprises an undercarriage including an electromotor and a linkage assembly to which an actuating pedal is attached. The actualing, or control, pedal operates mechanical control of the casters and the electromotor operates electric control of the casters, however, only provided that the actuating pedal of mechanical control of casters is always positioned in the initial neutral position. Should the bed be braked mechanically and the actualing pedal not be in the initial neutral position, the electric control of casters cannot be engaged, and vice versa. The electric control of casters cannot be used without switching the actuating pedal into the initial neutral position. A caregiver thus keeps physical checking all the time what the position of the actuating pedal is to select a manner of caster controlling.

Due to the above stated reasons and disclosed disadvantages it is desired to develop structurally simpler, faster and safer central control mechanism of casters which may be dually utilized for mechanical central control of casters as well as electrical central control of casters without any physical check or without any need to signal or indicate which control manner is activated at present and thus available for operation, A caregiver does not have to consider which control manner to select and may fully focus on giving care to a patient. In addition, safety handling with the bed Increases.

SUMMARY OF THE INVENTION

The above mentioned substantial insufficiencies of the existing known technical solutions are solved by disclosed technical solution herein, relating to patient support apparatuses in healthcare facilities, such as hospital beds, nursery beds, stretchers, medical examination chairs and any other suitable apparatuses for use in healthcare facilities, hereinafter be referred to as a bed, having a bed undercarriage with central dual control mechanism of casters.

A new and innovative caster device assembly is disclosed in the international patent application WO 2022068978 filed by the same applicant, which is thereby included herein in its entirety, relating to a triple cam comprising three different cams 4 that allow controlling of a caster using much less force than needs to be developed to control the existing conventional casters. A new and innovative caster device assembly is also disclosed in the international patent application WO 2021223782 filed by the same applicant, which is thereby included herein in its entirety, relating to a caster comprising a two-way band brake.

Referring to a summary of the invention disclosed herein, the newly invented technical solution presented herein eliminates the need to select a manner for controlling of casters, i.e. eliminate necessary selection of either only mechanical control, or electrical control separately, which always requires obligatory signalization of indication on the bed controller, or any other part of bed, which controlling manner for controlling casters is activated, i.e. if mechanical control is available for controlling of casters, or electrical control is available to operate casters.

The presented technical solution discloses a bed comprising a patient surface articulated deck that may have deck sections, the articulating deck defines a supporting surface for a mattress which in turns defines a patient support surface. The bed further comprises an upper frame supporting the articulating deck, a lifting mechanism, which may be in a form of scissor mechanism or telescopic columns or any other lifting mechanism suitable for healthcare facility beds, a base frame, i.e. undercarriage, such undercarriage being supported for movement in relation to supporting surface such as floor by number of casters. Casters are fixed to the undercarriage by a pin. The undercarriage further comprises an actuating pedal of central control mechanism of casters. The actuating pedal actuates either two casters positioned at the head or foot ends of the undercarriage and coupled by control shaft with hexagonal cross section, or all four casters using a linkage rod which couples both control shafts with hexagonal cross section coupling the casters and the head and foot ends of the bed. The actuating pedal of the central control mechanism of casters actuates casters mechanically when turned to position braked (lower position), unbraked (upper position) or ride (central position).

Bed casters can also be controlled electrically by a motor, preferably servomotor, hydraulic motor, electric motor or any other known motor suitable for use with healthcare facility beds. The motor may be positioned on the linkage rod of the central control mechanism or on the control shaft with hexagonal cross section coupling at least two casters.

The presented embodiment preferably connects both types, or methods, of caster controlling, i.e. mechanical control of casters and simultaneously electrical control of casters without any necessary signalization or indication which manner is activated, and also without necessary switching or positioning of the actuating pedal of the central control mechanism of casters into any neutral position. The motor is fixed to a linkage rod so that the casters may be controlled mechanically by the actuating pedal of the central control mechanism of casters as well as electrically by the motor in parallel. The presented embodiment of central control mechanism is thus fully dual. Upon mechanical control of casters the motor is reshuffled thanks to its internal configuration that offer minimum resistance, and on contrary, upon electrical control of casters electric force is transferred on the linkage rod of the central control mechanism of casters which displaces a position of the actuating pedal of the central control mechanism or the control shaft. The control shaft coupling the casters may preferably substitute individual actuating pedals of the individual casters.

The motor, which is preferably servomotor, is designed to be sufficiently forceful when being activated, and on contrary when deactivated to move the internal servomotor assembly with the smallest mechanical resistance. Such designed servomotor as described in details hereinafter allows dual control of casters.

The servomotor comprises a cogwheel and a pinion. The combination of the cogwheel and the pinion located in the servomotor enables dual control of casters, it means to control all casters mechanically or electrically regardless the position of the actuating pedal of the central control mechanism of casters. Toothed wheel, it means the cogwheel and the pinion move in relation to a rack which comprises rack protrusions on the bottom side of the rack by which the servomotor is fixed to the linkage rod of the central control mechanism of casters. Internal arrangement or configuration of the servomotor may use also another type of gearing as for example chain gearing or cogged/toothed belt etc. The embodiment using configuration of the cogwheel and the pinion is preferably the most suitable and the most faultless in comparison with other types of gearing.

The servomotor further comprises a position sensor that senses position of the cogged/toothed wheels, it means the position of the cogwheel and the pinion. The position sensor comprises two mechanical micro switches. Micro switches have two positions—closed and opened. Micro switches transmit information about four positions whereas for dual control it is necessary to have information about three basic positions—braked, unbraked and ride (straight movement direction). The intermediate position may be preferably used as the fourth position, it means that the servomotor is placed in the Indefinite position and is not placed in any of the defined positions—braked, unbraked and ride (straight movement direction). Also other types of position sensors may be used such as optic sensors, magnetic sensors, Hall sensor etc.

Various advantages of this invention will become apparent to those skilled in the art from the following detailed description of the preferred embodiments when read in light of the accompanying drawings.

LIST OF DRAWINGS

Various advantages of this invention will become apparent to those skilled in the art from the following detailed description of the preferred embodiments when read in light of the accompanying drawings.

EXEMPLARY EMBODIMENTS OF THE INVENTION

Figure 1:
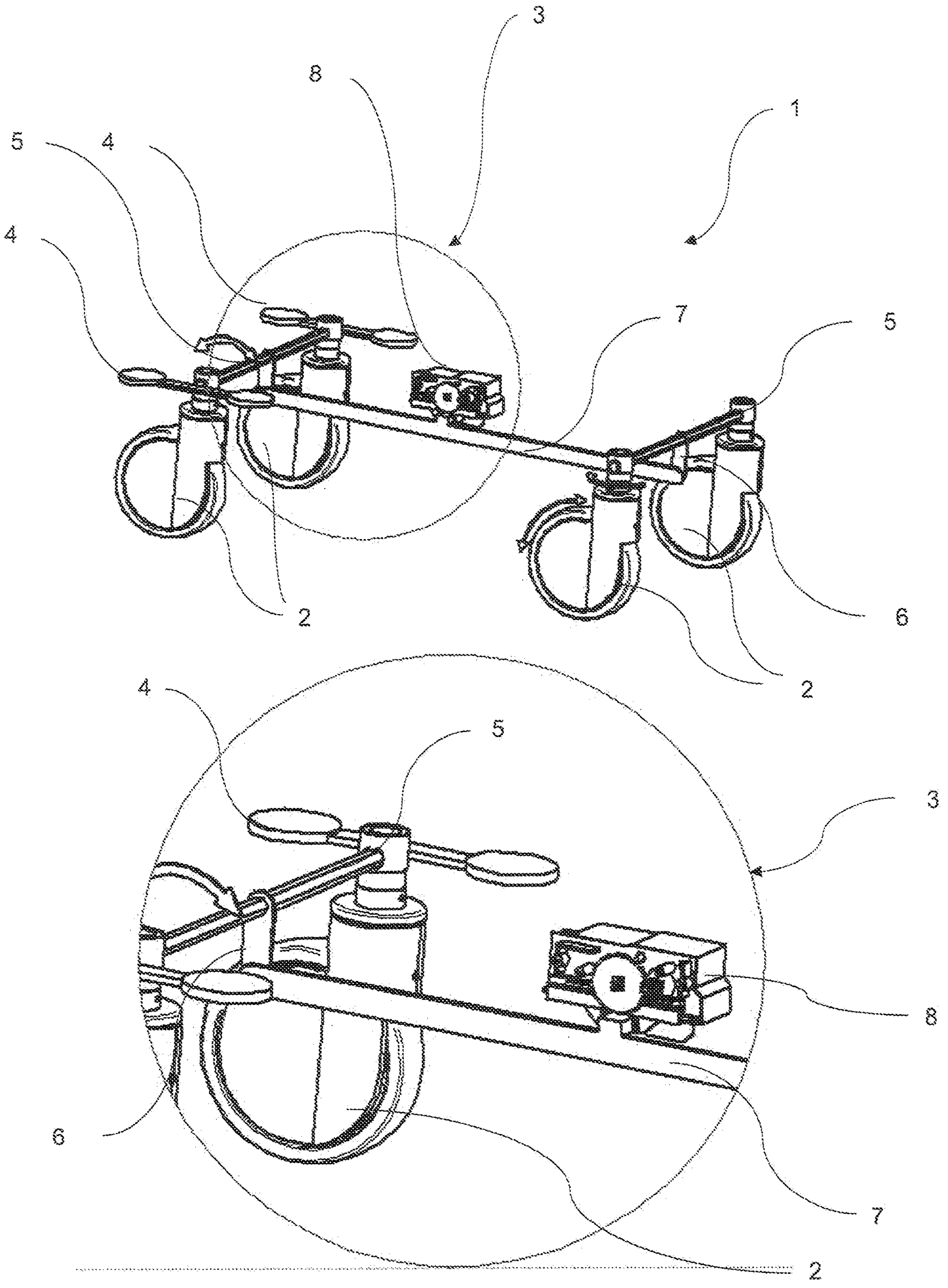
FIG. 1 shows arrangement of casters on the bed undercarriage excluding the base frame, which is not shown, and detailed attachment of a servomotor for central control of casters.

Patient support apparatuses being e.g. hospital beds, nursery beds, stretchers, examinational chairs or other suitable apparatuses for use in healthcare facilities (hereinafter be referred to as a bed) comprise an undercarriage with casters to move the bed easily to desired place. FIG. 1 shows schematically an undercarriage 1 with casters 2 and detailed view of an entire central dual control system 3 of casters. Casters 2 may be conventional casters, however preferably these casters 2 comprise a triple cam that is disclosed in the international patent application WO 2022068978 filed by the same applicant, which is thereby included herein in its entirety. The undercarriage 1 of a bed may comprise another type of casters 2 comprising a two-way band brake that is disclosed in the international patent application WO 2021223782 filed by the same applicant, which is thereby included herein in its entirety, whereas also such casters may comprise the above referred triple cam.

The central dual control system 3 of casters comprises a control shaft 5 with hexagonal cross section that couples two opposite casters, either at the head end of foot end in relation to base frame of the bed. In preferred embodiment, a connecting member 6 is located in the middle of the control shaft 5, attached to the control shaft 5 on one end, and on another end it is attached to one end of a linkage rod Z. Another end of the linkage rod Z is coupled via second connecting member 6 to the other control shaft 5 which couples the second pair of the casters 2. In another embodiment, the connecting member 6 may be positioned anywhere on the control shaft 5. In the preferred embodiment, a motor 8 is located in the middle of the linkage rod Z in relation to the undercarriage 1. It should be noted that the motor 8 may be located anywhere on the linkage rod Z, or anywhere on at least one control shaft 5.

The central dual control system 3 of casters is actuated mechanically by an actuating pedal 4, or remotely by a remote controller (not shown) attached to the support deck, side rail or headboard or footboard, via cable or wirelessly. The remote controller may be coupled directly to the 8 or a control unit of the bed (not shown). The remote controller is not shown on the picture, however at present it is a conventional standard component of many types of beds. The FIG. 1 shows a part of the undercarriage 1 with casters 2 that are coupled by a control shaft 5, preferably with hexagonal cross section. At least one actuating pedal 4 is located on one end of the control shaft 5. Actuating pedals 4 may be radially disposed on opposite sides of the control shaft 5 or may be located in the middle of linkage rod Z. By actuating at least one actuating pedal 4, the control shaft 5 turns and changes position of another actuating pedal 4 on the opposite end of the control shaft 5. Actuating of at least one actuating pedal 4 causes transfer of movement on the linkage rod Z, which is coupled to the second control shaft 5 via connecting member 6, and thus causes operation of the second pair of the casters 2 on the opposite end of the undercarriage 1. This mechanical control of the central dual control system 3 of casters 1 may be operated using actuating pedals 4 on any side of the undercarriage 1.

In the preferred embodiment, a motor 8, preferably servomotor, is located in the middle of the linkage rod Z. It should be noted the motor 8 may be disposed anywhere on the linkage rod Z. The servomotor 8 is fixed to the linkage rod Z at the point of a protrusion 9 on the linkage rod Z. The servomotor 8 operates the linkage rod Z, which then operates the casters 2 by positioning the casters 2 into three positions, remotely by a remote controller. The servomotor 8 may be controlled by the remote controller via cable or wirelessly using wireless controllers. It should be noted that the servomotor 8 may be substituted by any electric motor, hydraulic motor or any other know motor suitable to operate healthcare facility beds. The central dual control system 3 of casters may be in parallel operated (or actuated) mechanically by actuating pedals 4 or electrically by motor 8, it means may be operated dually.

Figure 2:
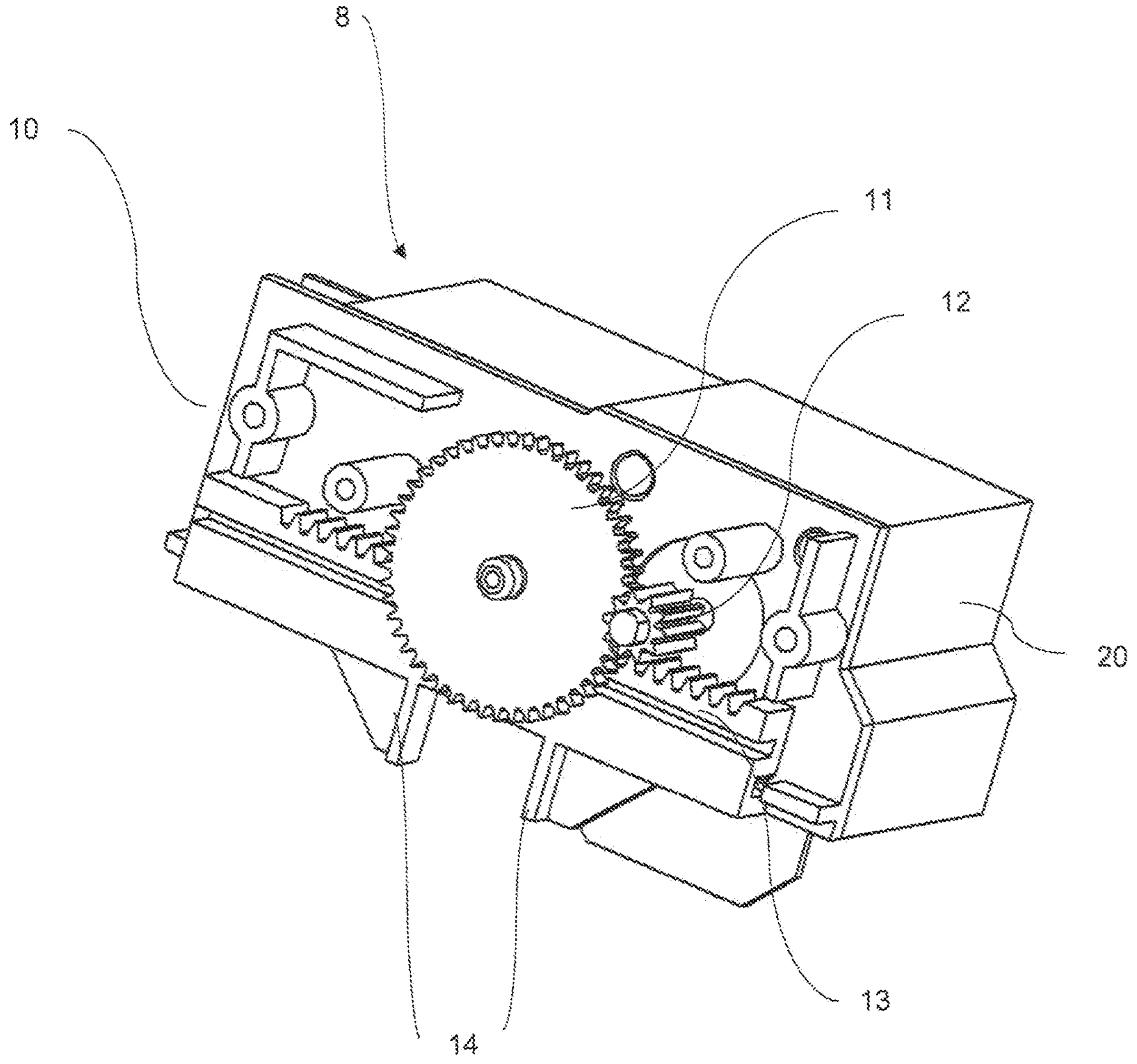
FIG. 2 shows schematically detailed view of internal arrangement of a servomotor.

The FIG. 2 shows a motor 8 and its internal mechanical part 10 operated by the motor 8 and internal gearing which enables dual operation and actuation of the central dual control system 3 of the casters 2. The FIG. 2 shows detailed disposition of the servomotor 8 comprising a rack 13. Rack protrusions 14 are visible on the bottom side of the rack 13. The rack protrusions 14 form a grove which engages a protrusion 9 of the linkage rod Z central dual control system 3 of the casters 2. This structure forms mechanical linkage between the linkage rod Z and the servomotor 8. A pinion 12 of the servomotor 8 interlocks a cogwheel 11 that operates the rack 13 by which a higher transference number is reached. This internal mechanical part 10 of the servomotor 8 may operate and control dually the individual positions of the casters 2. It means that the linkage rod Z of the central dual control system 3 of the casters 2 is operated and controlled either by the servomotor 8 so that the casters 2 are positioned into position braked, unbraked or straight movement direction (ride), or manually using the actuating pedal 4 and the linkage rod Z of the central dual control system 3 of the casters 2 so that the casters 2 are positioned into position braked, unbraked or straight movement direction (ride). Both above stated manners may be operated simultaneously, in parallel, without any need to return any component to an initial neutral position. Both mechanisms of dual control may be operated from any position in which the central dual control system 3 of the casters 2 is positioned.

Figure 3:
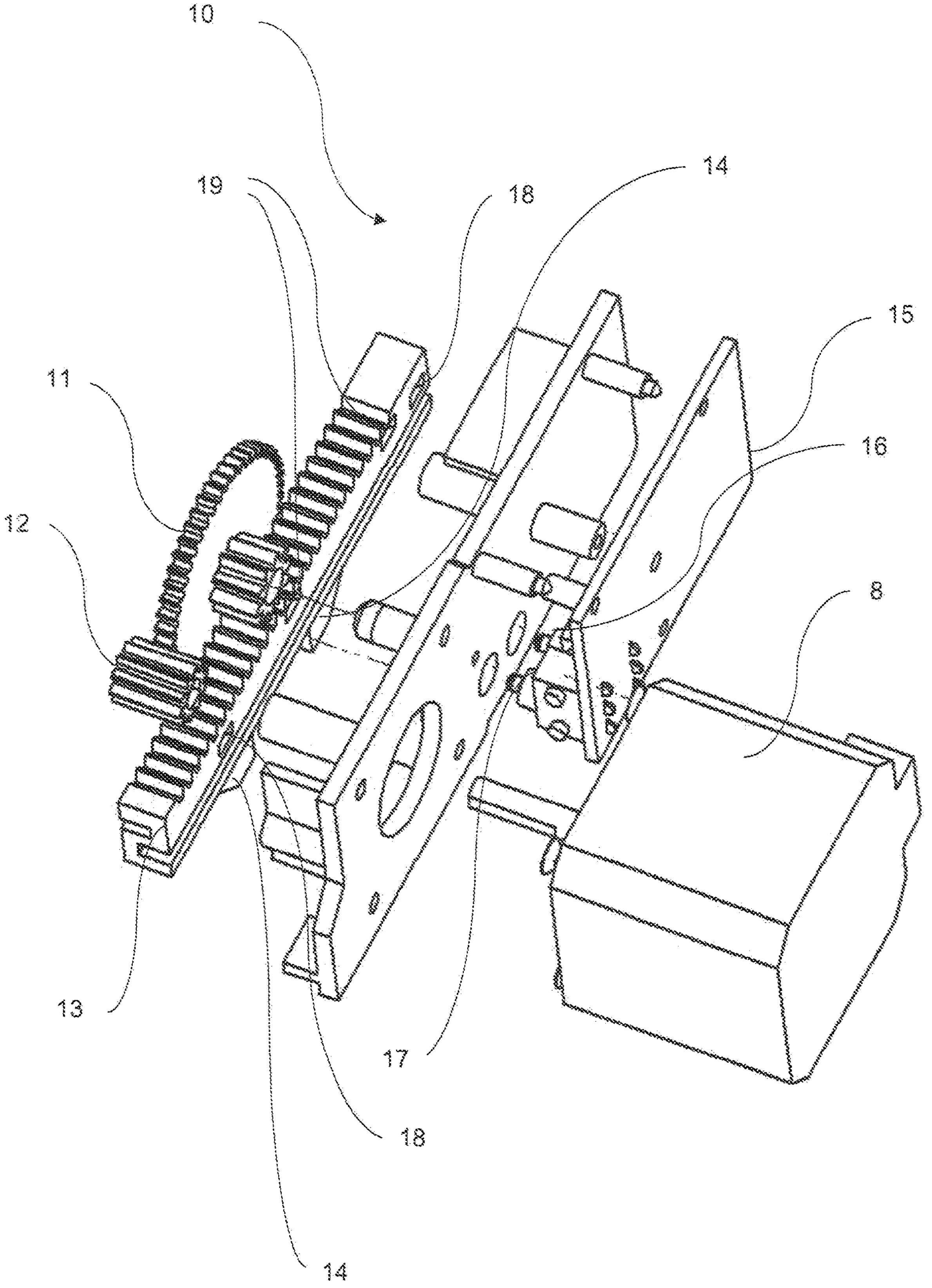
FIG. 3 shows exploded view of a servomotor.

The FIG. 3 shows exploded view of a servomotor 8 comprising a cogwheel 11, which is in contact with a pinion 12 of the servomotor 8, which moves a rack 13 by using the cogwheel 11. The rack 13 comprises rack protrusions 14 on the bottom side of the rack 13. Rack protrusions 14 form an opening on their bottom side through which the servomotor 8 is fixed to a linkage rod Z of the central dual control system 3 of the casters 2. Fixing to the linkage rod Z is not shown. The lateral side of the rack 13 comprises two bottom holes 18 of a micro switch and two upper holes 19 of a micro switch which engage two micro switches: a bottom micro switch 16 and an upper micro switch 17. Two micro switches 16 and 17 signal or indicate a position of the internal mechanical part 10 of the servomotor 8 according to a combination of on/off status of the micro switches 16 and 17. Micro switches 16 and 17 are located on the Printed Circuit Board 15 on which the entire control logic of the servomotor 8 is positioned. It should be noted that the control logic of the servomotor 8 may be analogue, or digital, however the logic type is not a subject matter of this invention herein.

Figure 4:
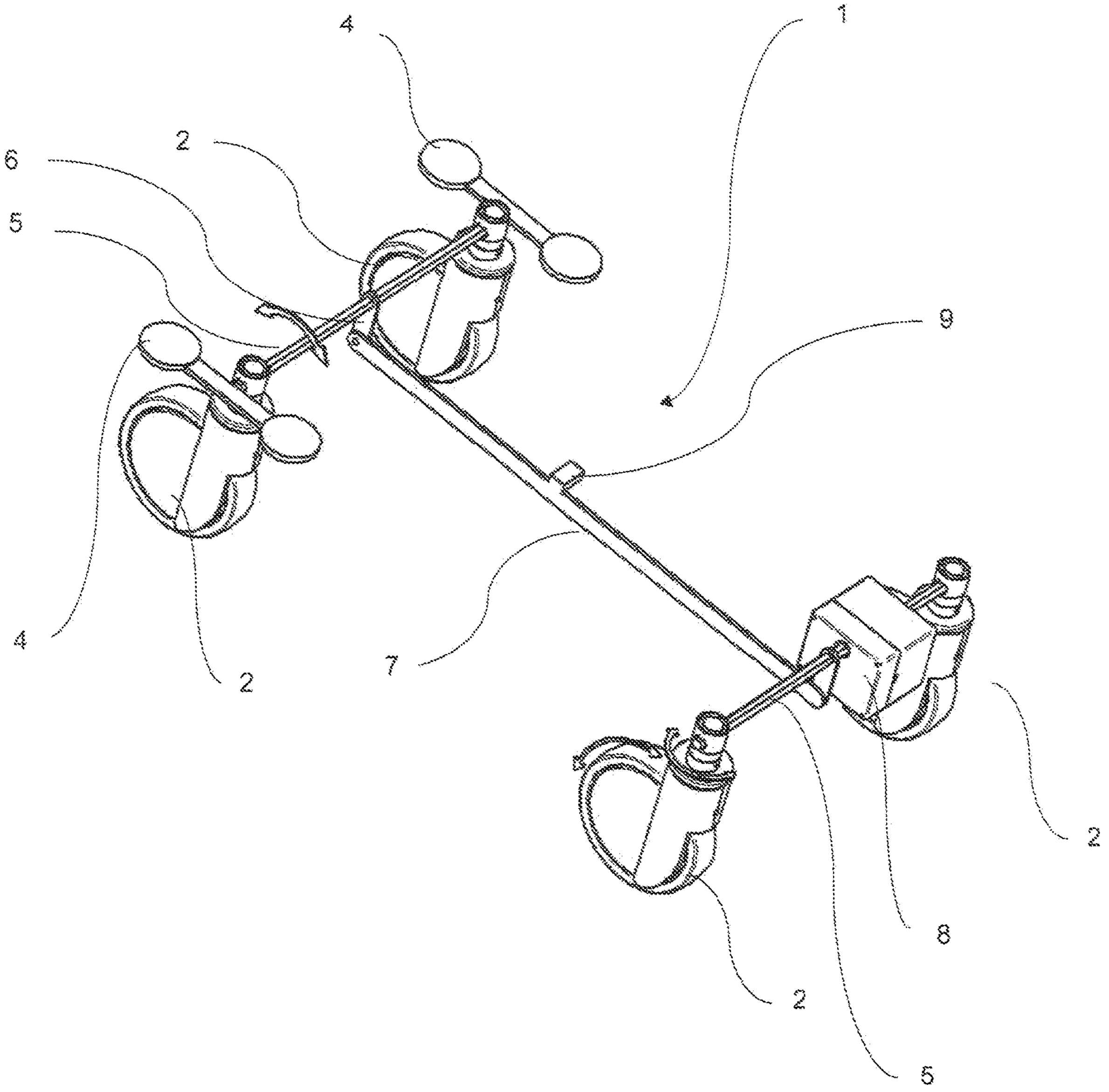
FIG. 4 shows the undercarriage with a servomotor.

The FIG. 4 shows location of a servomotor 8 in relation to an undercarriage 2 whereas the servomotor 8 is fixed to a control shaft 5 with hexagonal cross section which operates casters 2 and couples two opposite positioned casters 2 together. The FIG. 4 clearly shows that the undercarriage comprises four casters 2, whereas two opposite casters 2 at the head end of the bed and two opposite casters 2 at the foot end of the bed are coupled with a linkage rod Z of the central dual control system 3 of the casters 2 via a connecting member 6 on the control shaft 5 with hexagonal cross section. The linkage rod Z of the of the central dual control system 3 of the casters 2 which couples the control shafts 5, transfers movement of one pair of the casters 2 to the other pair of the casters 2. One pair of the casters 2 is operated and controlled by an actuating pedal 4, preferably by more actuating pedals 4 and the other pair of the casters 2 is operated remotely by using servomotor 8, which is operated by remote controller (not shown). The remote controller may be positioned anywhere on a side rail, or a bed frame or a headboard or footboard of the bed and is connected with the servomotor 8 by cable. It should be noted that in another embodiment the remote controller may communicate with the 8 wirelessly via wifi, Bluetooth or any other wireless technology (not shown). The servomotor 8 is preferably a rotation servomotor where the outlet movement of the servomotor 8 is rotational and the internal mechanical part 10 of the servomotor 8 moves along the toothed segment 21 axis.

Figure 5:
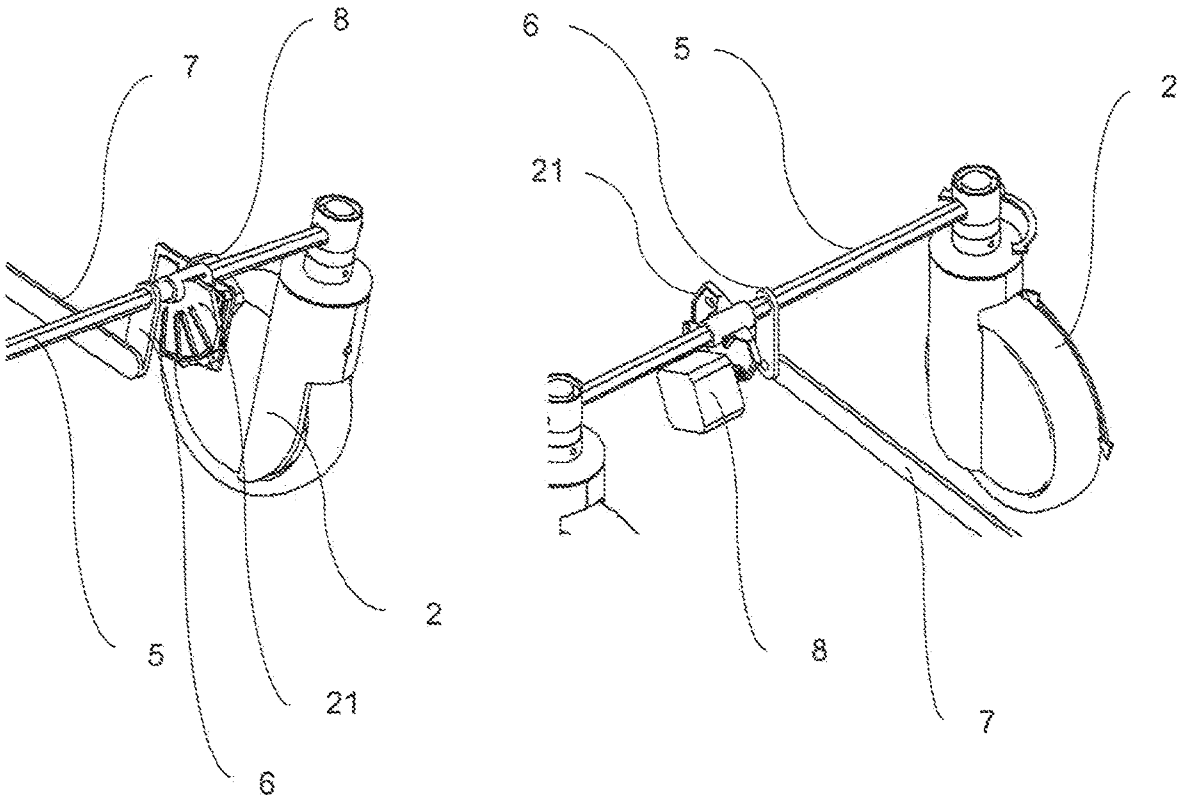
FIG. 5 shows detailed view of position of a servomotor.

The FIG. 5 shows two views of a part of an undercarriage 1. The left view shows a caster 2 attached to a control shaft 5 with hexagonal cross section which comprises a connecting member 6 located in the middle in relation to the control shaft 5. The connecting member 6 is on its opposite end coupled to a linkage rod Z of the central dual control system 3 of the casters 2. A servomotor 8 is positioned next to the connecting member 6 on the control shaft 5. The FIG. 5 shows only a part of the servomotor 8 with a toothed segment 21. The right view shows also a servomotor 8 with a toothed segment 21. In this embodiment of the servomotor 8 an internal rotational toothed segment 21 is used instead of a rack 13. This toothed segment 21 is attached directly to the control shaft 5 with hexagonal cross section. The toothed segment 21 comprises holes 18 and 19 to operate micro switches 16 and 17.

Figure 6:
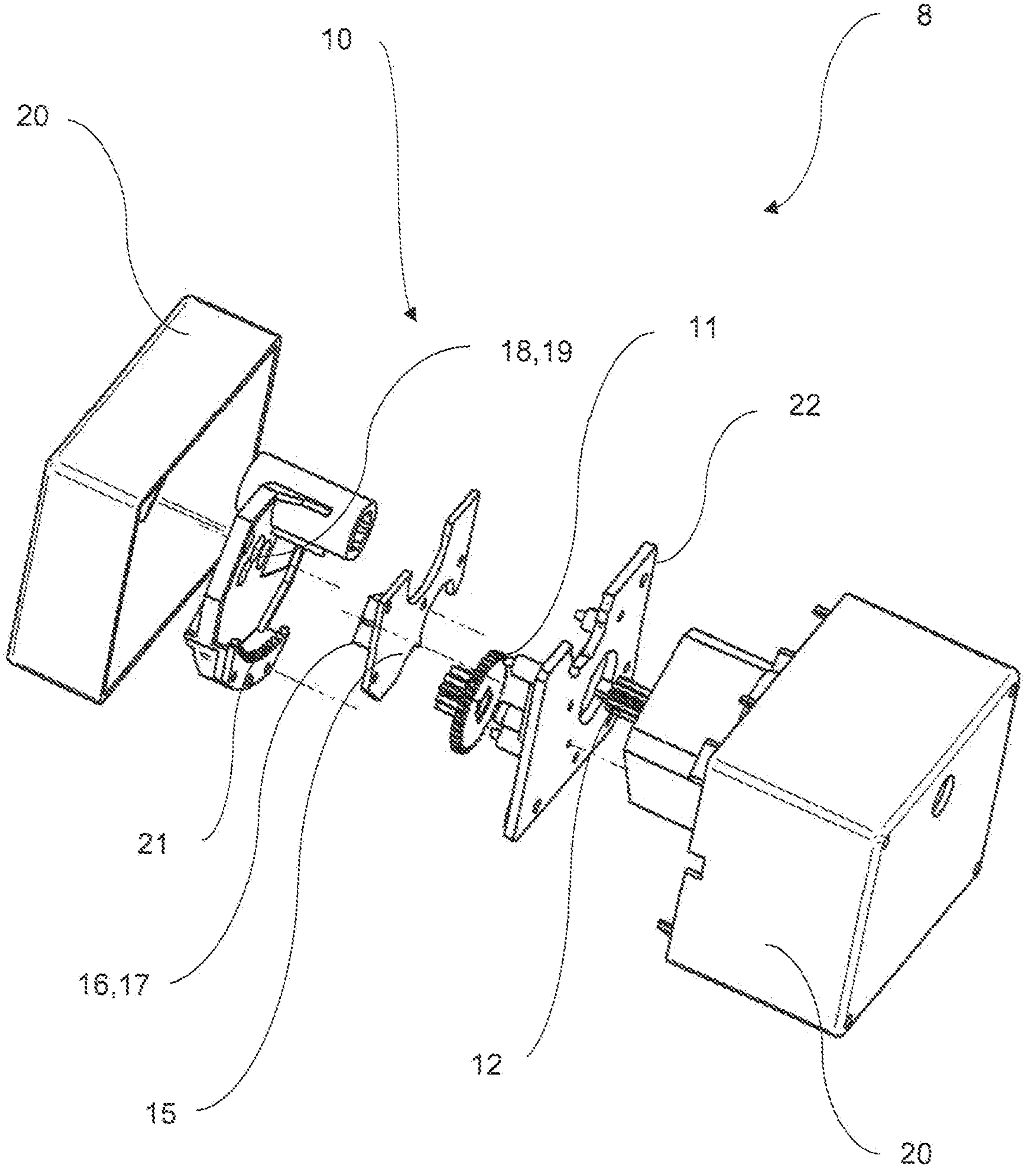
FIG. 6 shows exploded view of a servomotor.

The FIG. 6 shows an exploded view of a rotational servomotor 8. The servomotor 8 comprises an internal mechanical part 10 of the servomotor 8, a pinion 12, a holder 22, a cogwheel 11, a Printed Circuit Board 15 with micro switches 16 and 17, a toothed segment 21 with a hole to attach a control shaft 5 with hexagonal cross section, and holes 18 and 19, and micro switches 16 and 17. The entire servomotor 8 is located beneath an enclosure 20 of the servomotor 8. The toothed segment 21 comprises a hexagonal opening which engages the control shaft 5 with hexagonal cross section. The FIG. 6 further shows the holes 18 and 19 in the toothed segment 21 to sense positions by means of micro switches 16 and 17 to define the position of the control shaft 5 with hexagonal cross section which couples and operates the casters 2.

LIST OF REFERENCES

1. Undercarriage
2. Caster
3. Central dual control system (of casters)
4. Actuating pedal (of central control mechanism)
5. Control shaft (with hexagonal cross section)
6. Connecting member
7. Linkage rod
8. Servomotor (motor)
9. Protrusion (to fix the servomotor)
10. Internal mechanical part of the servomotor
11. Cogwheel
12. Pinion
13. Rack
14. Rack protrusion (for attaching to linkage rod)
15. Printed Circuit Board (PCB)
16. Bottom micro switch
17. Upper micro switch
18. Bottom holes (of micro switch)
19. Upper holes (of micro switch)
20. Enclosure
21. Toothed segment
22. Holder

The invention claimed is:

1. A patient support apparatus comprising:

a first pair of casters;

a second pair of casters;

a first control shaft operatively connected to the first pair of casters;

a second control shaft operatively connected to the second pair of casters;
a linkage rod operatively coupling the first control shaft and the second control shaft;
a servomotor operatively coupled to the linkage rod or to at least one of the first control shaft and the second control shaft;
at least one micro switch;
a pinion;
a cogwheel engaged with the pinion; and
a rack configured to be moved by the cogwheel;
wherein the rack comprises a rack protrusion configured to engage the linkage rod;
wherein a lateral side of the rack comprises at least one lower hole and at least one upper hole; and
wherein the at least one micro switch cooperates with the at least one lower hole and the at least one upper hole to indicate a position of the rack.

2. The patient support apparatus of claim 1, further comprising a printed circuit board, wherein the at least one micro switch is located on the printed circuit board.

3. The patient support apparatus of claim 2, wherein the servomotor comprises the printed circuit board.

4. The patient support apparatus of claim 1, wherein the servomotor comprises an internal mechanical part comprising the pinion, the cogwheel, and the rack.

5. The patient support apparatus of claim 1, wherein the servomotor is configured to be decoupled from the linkage rod.

6. The patient support apparatus of claim 1, wherein at least one of the control shafts comprises a hexagonal cross section, and wherein the servomotor is configured to be attached to the hexagonal cross section of the at least one control shaft.

7. The patient support apparatus of claim 1, wherein the servomotor is removable from the linkage rod.

8. A patient support apparatus comprising:
a first pair of casters;
a second pair of casters;
a first control shaft connected to the first pair of casters;
a second control shaft connected to the second pair of casters;
a linkage rod operatively coupling the first control shaft and the second control shaft;
a servomotor operatively coupled to the linkage rod or to at least one of the first control shaft and the second control shaft;
at least one micro switch;
a pinion;
a cogwheel engaged with the pinion; and
a toothed segment movable by the cogwheel;
wherein a side of the toothed segment comprises at least one hole; and
wherein the at least one micro switch cooperates with the at least one hole to indicate a position of the toothed segment.

9. The patient support apparatus of claim 8, further comprising a printed circuit board, wherein the at least one micro switch is located on the printed circuit board.

10. The patient support apparatus of claim 9, wherein the servomotor comprises the printed circuit board.

11. The patient support apparatus of claim 8, wherein the pinion, the cogwheel and the toothed segment are an internal mechanical part of the servomotor.

12. The patient support apparatus of claim 8, wherein the servomotor is removable from the linkage rod.

13. The patient support apparatus of claim 8, wherein at least one of the control shafts comprises a hexagonal cross section and the servomotor is configured to be attached to the hexagonal cross section of the at least one control shaft.

14. The patient support apparatus of claim 8, wherein the at least one micro switch comprises a first micro switch and a second micro switch.

* * * * *